US006898209B2

(12) United States Patent
Dekeyser

(10) Patent No.: US 6,898,209 B2
(45) Date of Patent: May 24, 2005

(54) METHOD AND APPARATUS FOR ASSEMBLING FRAMES

(75) Inventor: Miek Dekeyser, Rumst (BE)

(73) Assignee: Alcatel, Paris (FR)

( * ) Notice: Subject to any disclaimer, the term of this patent is extended or adjusted under 35 U.S.C. 154(b) by 863 days.

(21) Appl. No.: 09/795,189

(22) Filed: Mar. 1, 2001

(65) Prior Publication Data

US 2001/0024453 A1 Sep. 27, 2001

(30) Foreign Application Priority Data

Mar. 22, 2000 (EP) .......................................... 00400792

(51) Int. Cl.$^7$ ................................................ H04J 3/24
(52) U.S. Cl. ...................................... 370/474; 370/429
(58) Field of Search ................................ 370/413, 428, 370/429, 474, 458, 412, 395.1, 509, 535, 392; 711/147

(56) References Cited

U.S. PATENT DOCUMENTS

| | | | | | |
|---|---|---|---|---|---|
| 4,999,834 | A | * | 3/1991 | Leo et al. ................... 370/241 |
| 5,206,858 | A | * | 4/1993 | Nakano et al. ............. 370/465 |
| 5,446,738 | A | * | 8/1995 | Kim et al. ............. 370/395.42 |
| 5,666,351 | A | * | 9/1997 | Oksanen et al. ............ 370/474 |
| 5,781,554 | A | * | 7/1998 | Organ ........................ 370/474 |
| 5,781,598 | A | | 7/1998 | Hardy, III |
| 5,809,024 | A | * | 9/1998 | Ferguson et al. ...... 370/395.53 |
| 5,828,901 | A | * | 10/1998 | O'Toole et al. ............... 710/22 |
| 5,875,292 | A | * | 2/1999 | Taketsugu .................... 714/18 |
| 5,909,468 | A | * | 6/1999 | Lawrence .................... 375/295 |
| 6,137,778 | A | * | 10/2000 | Yoshida .................. 370/395.62 |
| 6,178,184 | B1 | * | 1/2001 | Petty .......................... 370/503 |
| 6,188,685 | B1 | * | 2/2001 | Wolf et al. .................. 370/378 |
| 6,480,489 | B1 | * | 11/2002 | Muller et al. ............... 370/389 |
| 6,480,511 | B1 | * | 11/2002 | Petty .......................... 370/509 |
| 6,483,854 | B1 | * | 11/2002 | Klausmeier et al. ........ 370/474 |
| 6,526,069 | B1 | * | 2/2003 | Wolf et al. .................. 370/503 |
| 6,618,396 | B1 | * | 9/2003 | Kondo et al. ............... 370/474 |
| 6,667,978 | B1 | * | 12/2003 | Delp et al. ............... 370/395.1 |
| 6,714,985 | B1 | * | 3/2004 | Malagrino et al. .......... 709/236 |
| 6,731,632 | B1 | * | 5/2004 | Takahashi et al. .......... 370/392 |

FOREIGN PATENT DOCUMENTS

| EP | 0 377 136 A2 | 7/1990 |
|---|---|---|
| EP | 0 658 028 A2 | 6/1995 |

* cited by examiner

Primary Examiner—Ajit Patel
Assistant Examiner—Steven A Blount
(74) Attorney, Agent, or Firm—Sughrue Mion, PLLC

(57) ABSTRACT

A method for assembling frames of a multiframe that calculates the value of an identifier for inclusion within each of the frames before the frames are transmitted at a transmitter clock rate. The amount of distinct values that the identifier can have is less than the amount of frames within the multiframe. This identifier is extracted from the frames in a receiver, and is used for determining a position in a temporary buffer having an amount of memory locations that is smaller than the amount of frames within the multiframe. The frames are read from positions in the temporary buffer for storage into subsequent locations into a multiframe buffer memory, irrespective of the value of the identifier. The receiver clock is synchronized with the transmitter clock.

26 Claims, 2 Drawing Sheets

METHOD AND APPARATUS FOR ASSEMBLING FRAMES

BACKGROUND OF THE INVENTION

The present invention relates to a method for assembling frames of a multiframe by calculating, for each of the frames, the value of an identifier for inclusion into each of the frames before transmitting them at the rate of a transmitter clock, wherein the frames are temporarily stored in a temporary buffer of a receiver before reading them out from the temporary buffer for storage to a multiframe buffer memory of a receiver, and to a frame receiver device comprising a temporary buffer adapted to temporarily store incoming frames, a multiframe buffer memory coupled to the temporary buffer and adapted to store incoming frames received from the temporary buffer.

It is well known that in many ATM-TDM systems, such as for instance the APON system, which is the abbreviation of asynchronous passive optical networks, ATM cells transmitted at a transmitter, for instance an optical line termination unit, hereafter abbreviated as OLT, have to be recombined in the correct sequence at the receiver. This is especially true in case Channel Associated Signalling, is used. In this case, a multiframe is composed of 16 previously sent TDM frames, to be completed with specific Channel Associated Signalling information for further use by a downstream user. In case these frames can arrive asynchronously, and not in the sequence they were previously sent by the transmitter, for instance due to cell delay variation problems, the only solution for properly assembling them in the multiframe was to first temporarily buffer them in a temporary buffer memory, after which, if all 16 frames were received, they could be read out from this memory for assembly into the multiframe buffer memory. Such a straightforward method thereby not only requires a large temporary buffer memory, but also introduces an additional delay because of this temporary storage action. Furthermore this solution implies that within each transmitted frame, an identifier having a number of 1 to 16 is to be included, so as to allow the correct positioning of the TDM frame into the multiframe memory. In the previously mentioned APON system, however, the TDM frame is limited in the sense that only 3 bits can be included for this identifier as is standardized by the ITU-T specification 363.1. This makes it nearly impossible to use this prior art solution, since with 3 bits, only 8 different memory addresses can be accessed.

The additional delay is thereby also not acceptable for envisaged applications such as leased line services where delay requirements of 625 to 650 microseconds are common.

SUMMARY OF THE INVENTION

It is therefore an aspect of the present invention to provide a method, and a frame receiver device of the above known type, which is less complex, which provides less delay than the prior art method and which allows to transmit less identification bits than are strictly necessary for identifying each frame position into the multiframe.

According to the invention, the method comprises calculating, for each frame, the value of an identifier for inclusion into each frames before transmitting the frames from a transmitter at the rate of a transmitter clock, temporarily storing the frames into a temporary buffer of a receiver before reading them out from the temporary buffer for storage to a multiframe buffer memory. The method further comprises synchronizing a receiver clock with the transmitter clock, calculating the identifier according to a predetermined algorithm such that an amount of distinct values that the identifier can have is less than the amount of frames within the multiframe, extracting the identifier from the frames within the receiver for determining a position in the temporary buffer for storing incoming frames, wherein an amount of memory locations of the temporary buffer is smaller than the amount of frames within the multiframe, and the frames are read from positions in the temporary buffer for storage into locations of the multiframe buffer memory, irrespective of the identifier value, and that the frame receiver device comprises a temporary buffer arrangement that receives incoming frames of a multiframe transmitted from a transmitter and comprising a temporary buffer to temporarily store the incoming frames, and a multiframe buffer memory coupled to the temporary buffer arrangement and adapted to store the incoming frames received from the temporary buffer arrangement. The frame receiver further comprises a receiver clock synchronized with a transmitter clock, the temporary buffer has an amount of memory locations that is smaller than the amount of frames within the multiframe, the temporary buffer arrangement comprises identifier extraction means to extract an identifier from each incoming frame, whereby an amount of distinct values that the identifier can have is less than the amount of frames within the multiframe, the temporary buffer arrangement comprises write addressing means to calculate, from the value of the identifier from a respective incoming frame, a write position address within the temporary buffer for storing the respective incoming frame, and the temporary buffer arrangement comprises read addressing means to calculate a read position address of a memory location within the temporary buffer from which an already stored frame is going to be read for storage into the multiframe buffer, irrespective of the value of the identifier of the already stored frame.

In this way, the use of synchronization between the transmitter and the receiver, in conjunction with specific algorithms for determining the identifier value, and for writing and reading the frames in and out of the temporary buffer thereby allow, with a minimum on storage area and delay, to have these incoming frames to be placed in the correct multiframe memory location. The temporary buffer thereby has substantially less memory locations than the number of frames constituting the multiframe structure. As will become clear in a further paragraph, the specific writing and reading addressing algorithms for this temporary buffer are such that the frames which are subsequently read out from this temporary buffer for further storing one after the other into the multiframe buffer, are placed in the latter in their originally transmitted sequence.

A further characteristic feature of the present invention is the amount of memory locations of the temporary buffer is not smaller than the maximum cell delay between the transmitter and the receiver, and the amount of distinct values that the identifier can have is larger than the maximum cell delay.

This represents a lower boundary condition both for the number of memory locations in the temporary buffer, as well as for the amount of values this identifier can have.

Still a further characteristic feature of the present invention is a write position address of a memory location within the temporary buffer, into which an incoming frame is to be written, is calculated from the amount of memory locations within the temporary buffer, from the value of the identifier included in the incoming frame, from the amount of distinct values that the identifier can have and from a recorded amount of transmitter clock pulses. A write addressing means calculates the write position address from the amount of memory locations within the temporary buffer, from the amount of distinct values that the identifier can have and from a recorded amount of transmitter clock pulses.

By taking into account the number of memory locations within this temporary buffer, the value of the inserted identifier, the maximum number of different identifier values, and a recorded amount of transmitter clock pulses, a simple write addressing scheme is possible, yet allowing for a small temporary buffer. It is to be remarked that throughout this document the term "cell delay", which is a commonly standardized feature in telecommunications applications, means the maximum delay a frame can experience between transmitter and receiver.

The write position address is calculated in accordance to the following formula:
pw=(((c+x−i−1) modulo m)+i+1) modulo d, with pw representing the write position address within the temporary buffer into which an incoming frame is to be written, m represents the amount of distinct values, c represents the value of the identifier included in the incoming frame, i represents the recorded amount of transmitter clock pulses and x represents the amount of memory locations within the temporary buffer.

Yet another characteristic feature of the present invention is a read position address of a memory location within the temporary buffer from which an already stored frame is going to be read for subsequent transmission into the multiframe buffer memory is calculated from the amount of memory locations within the temporary buffer and the recorded amount of transmitter clock pulses.

The read addressing scheme for transfer of frames out of the temporary buffer into positions into the multiframe buffer is calculated from the recorded amount of transmitter clock pulses. This allows for a very simple algorithm, for example represented by the formula pr=i modulo x, whereby pr represents the read position address, i represents the recorded amount of transmitter clock pulses and x represents the amount of memory locations within the temporary buffer.

A simple algorithm for calculating the identifier value is c=i modulo m, whereby i represents the recorded amount of transmitter clock pulses and m represents the amount of distinct values that the identifier can have.

The present invention as well relates to a transmitter which is adapted to transmit subsequent frames of a multiframe to a receiver and to insert in each of them an identifier with an amount of distinct values which is less than the amount of frames within the multiframe structure, and which is further adapted to transmit the frames at the rate of a particular clock, which is synchronous with a receiver clock. The present invention also relates to receiver device including the previously described frame receiver device, as well as to a communications network including such a transmitter and receiver device.

BRIEF DESCRIPTION OF THE DRAWINGS

The above and other aspects and features of the invention will become more apparent and the invention itself will be best understood by referring to the following description of an embodiment taken in conjunction with the accompanying drawings wherein.

DETAILED DESCRIPTION OF THE INVENTION

The present invention is used in applications where individual frames, part of a multiframe structure, that are transmitted in a particular sequence, are to be recombined in this sequence such as to reconstruct this multiframe. The term "frame" indicates any data packet of a fixed length, whereby a multiframe corresponds to a longer structure being composed of a predetermined number of such packets. The invention is applicable to, for instance, 2 Mbps CAS TDM frames that form part of a multiframe structure with 16 frames, but also to ITU-T X.50 frames that form part of a multiframe structure with 20 or 80 frames, robbed bit signalling channels that form part of a multi-frame structure with 6 or 12 frames and other examples that are known to a person skilled in the art.

During their transmission towards the receiver, the different frames may suffer from cell delay and cell delay variation problems. Cell delay is to be understood as the time, expressed in number of transmitter clock pulses, between the moment a frame leaves the transmitter and the moment this same frame arrives in the receiver. Cell delay variation is to be understood as the variation that can occur between different transmission times such frame can experience. The situation where packets, cells or frames are subject to different transmission times between transmitter and receiver happens for instance in all ATM-based networks such as APON networks, HFC (Hybrid Fiber Coax) networks, ADSL (asymmetric digital subscriber line) networks, frame relay networks, IP networks . . . Cell delay variation can result in a change in the order of receipt of the cells, with respect to their transmission sequence order. To cope with such problems, in prior art solutions each frame is attributed an identifier corresponding to the sequence number of the frame in the multiframe structure. At the receiver, the individual frames are then temporarily buffered until they are all received, after which the reconstruction of the multiframe can take place based on this sequence number or identifier. This, however, consumes time, and buffer memory, especially when a lot of frames form part of such a multiframe.

Another difficulty occurs when the number of bits reserved for this identifier is smaller than the amount of frames in the multiframe structure, making this straightforward solution even impossible.

Figure 1:
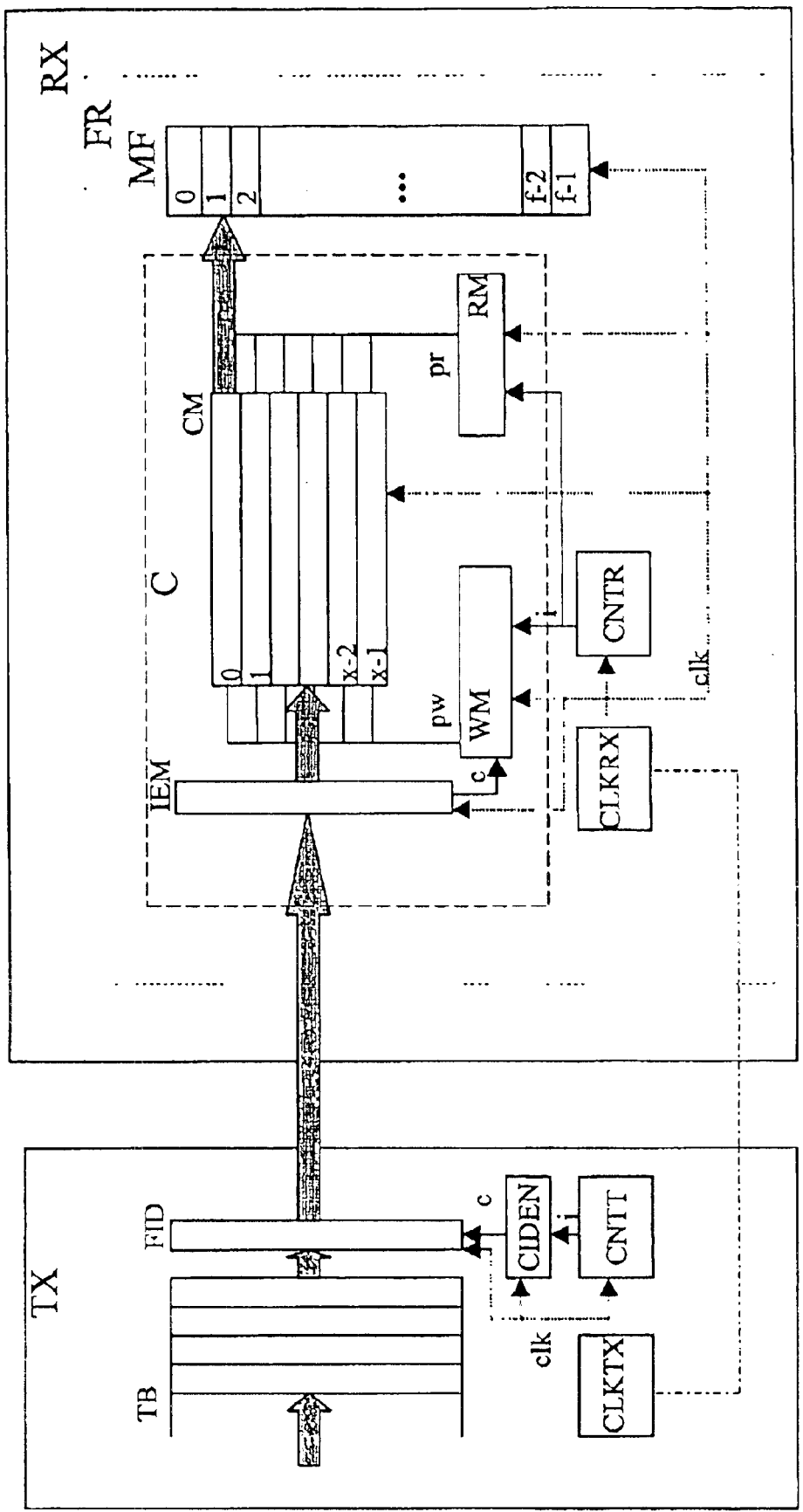
FIG. 1 schematically depicts a communications network in accordance to the present invention, including a receiver RX with a frame receiver device FR according to the present invention and a transmitter TX according to the present invention.

The subject method, as well as the subject receiver and transmitter, are however able to cope with these problems. The transmitter is schematically shown in FIG. 1 as TX, the receiver as RX. The receiver RX includes a frame receiver device FR, having an input terminal IN on which the frames transmitted by TX are received and stored in a temporary buffer memory CM being part of a temporary buffer arrangement C. In one embodiment, this temporary buffer memory comprises of a circular buffer memory, but other memories are possible as well. The number of memory locations x in this circular memory is, however, smaller than the amount of frames f included in the multiframe, yet larger than or equal to the maximum cell delay d expressed in number of transmitter clock pulses. In FIG. 1, the memory locations in CM all have an address ranging from 0 to x−1.

For practical reasons, it may ibe more convenient to choose a circular buffer with more memory positions than the strict minimum being the cell delay parameter d. This is the case when d is no power of 2. Choosing a memory with an amount of memory positions that is slightly larger than d, but being a power of 2, is a more cost-effective solution since these memories are more commercially available and are thus cheaper.

According to a first aspect of the invention, the transmitter and the receiver are synchronized. This can occur in a lot of different ways, for instance as specified by the ITU-T specification G.983.1 chapter 8.3.5.3.4. for APON systems. This synchronization results in synchronized clocks at the transmitter and the receiver. These clocks are respectively denoted CLKTX and CLKRX, whereby their synchronization is symbolized by the broken line between them. At the rate of this clock, the transmitter sends the individual frames, wherein an identifier c is included. This identifier has an integer value between 0 and m−1, m thus being the maximum amount of values c can have. For embodiments where c is represented as a series of bits, this number of bits b is thus such that m=2b. In general, m is limited by the amount of bits reserved for this identifier within each frame, which is standardized in most cases.

The method is valid as long as the value m is strictly larger than d, d being the maximum cell or frame delay, expressed in number of clock periods, between transmitter and receiver, whereby subsequent frames are transmitted during subsequent clock periods. This value d is guaranteed for the communications network. The value of this delay is in general dependent on the characteristics of the transmission medium used between the transmitter and the sender.

At each clock pulse, a frame is thus sent. The value of the identifier c of the frame transmitted at each clock pulse is calculated as $$c = i \text{ modulo } m \qquad (1)$$

with i representing a recorded amount of transmitter clock pulses, which, if the transmitter clock is reset at the start of the transmission, and if each clock pulse a frame is sent, also corresponds to the number of transmitted frames so far. This value can correspond to the sequence number of the clock pulses thus provided that the transmitter clock is reset at the start of transmission. In the embodiment depicted in FIG. 1, i is obtained as the output value of a counter CNTT counting at the rate of the clock CLKTX, increasing its value at each clock pulse. During the first transmission clock period, i=0.

The value of the identifier c is calculated in an identifier calculating means CIDEN, at the rate of the clock, and receiving the subsequent values of i. The thus calculated values of c are inserted in each to be transmitted frame by means of an identifier insertion device denoted FID. The latter receives the subsequent frames from a transmit buffer TB. The flow of incoming frames, generated by other circuitry (not shown on FIG. 1) within TX is shown by the thick grey arrow arriving at TB. FID, besides inserting the identifier c at the rate of the clock clk, is also further adapted for the transmission of the thus adapted frame to the receiver RX, also at the rate of the clock. The flow of transmitted frames is also schematically represented by the thick grey arrow between transmitter and receiver. The clock pulse signal is represented as the thin dashed line between CLKTX, CNTT, CIDEN and FID.

In the formula (1), the modulo operation indicates the integer and positive rest of the division of i by m.

As already mentioned, the frame receiver device FR of the receiver includes a circular buffer arrangement with a circular buffer CM having x memory positions. Within this circular buffer arrangement C the subsequent incoming frames are first received within an identifier extracting means, denoted by IEM. This device has an input terminal IN and is adapted to extract from each incoming frame its identifier c, at the rate of the clock clk, delivered by the receiver clock CLKRX. The value of this extracted identifier c is then provided to a write addressing means WM. WM calculates from c, from the value of x, from the value of i provided by a similar counter CNTR, and from the value of m, the address of the position in which the received frame or frames are going to be written. Since x and m are constant values, these can be stored within WM. During each clock period, a read addressing means RM calculates as well the address of the position from which a frame is going to be read from CM for placement into the multiframe buffer memory MF of the frame receiver device FR.

In the depicted embodiment, the memory CM of the circular buffer arrangement comprises a number of write addressing lines, controlled by the write addressing means, and a number or read addressing lines, controlled by the read addressing means. At each clock period, the write and read addresses are thereby calculated by the respective means WM and RM, and are provided as control signals pw and pr, thereby controlling the write access and read access lines of this memory CM.

The write and read addressing algorithms will now be discussed.

This receiver has a circular buffer of x positions, with x larger than or equal to d, and smaller or equal to the amount of frames f in the multiframe. Every memory position of this circular buffer can contain one frame. These positions are having an address, numbered from 0 to x−1. Two activities are going on in this circular buffer:

at the beginning of every clock period, the frame in position with the address $$pr = i \text{ modulo } x \qquad (2)$$

whereby i represents the recorded amount of transmitter clock pulses.

The frame is read out from the circular buffer CM and written in the next free position of the multiframe buffer MF, the position from which this frame is read out is erased.

When a frame containing an identifier with value c is received during this clock period, this cell is written at the position with the address pw according to the following write addressing algorithm:

$$pw = (((c+x-i-1) \text{ modulo } m) + i + 1) \text{ modulo } d \qquad (3)$$

with pw representing the write position address within said circular buffer into which this incoming frame is to written, m represents the amount of distinct values c can have;

c represents the value of the identifier included in the incoming frame;

i represents the recorded number of transmitter clock pulses;

d represents the maximum cell or frame delay.

This value can be derived from a counter CNTR counting at the rate of the receiver clock CLKRX. Since the receiver clock is synchronized with the transmitter clock, the "i" values thus obtained are the same in transmitter and receiver.

During the first clock period, this value is 0, during the second clock period this value is 1, etc.

Figure 2:
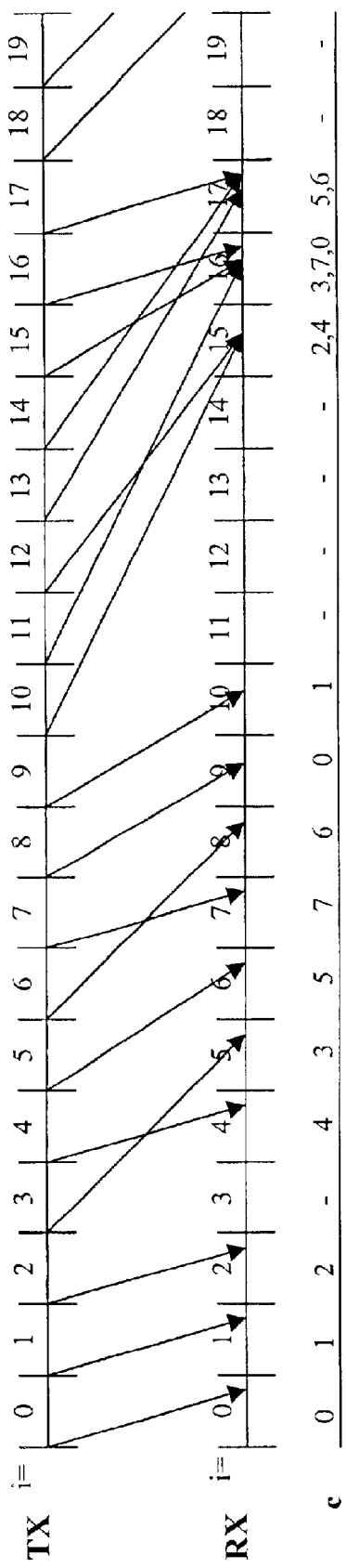
FIG. 2 illustrates the method by means of an example.

The mechanism of which frames are written and read out of the circular buffer can be followed in FIG. 2. Therein the different clock pulses at the transmitter TX with the corresponding values of i are schematically shown in the upper line, as well as the frames that are transmitted in each clock period by TX. The next line shows the same clock pulses, again with the corresponding value of the counter i, and also indicates which cells are received within which clock period. In the following line, the frame identifier c is shown for the cells that are received, whereby the frame identifier was earlier calculated in the transmitter in accordance to formula (1).

Then the circular buffer memory CM is shown for the case where x=d=6, and for m=8. CM thus has 6 memory positions, numbered from 0 to 5. It is assumed that initially this buffer is empty. During each clock cycle, the identifier of the frames that are written in CM is denoted in italic and is surrounded by a rectangle, whereas the cells that are read out from this buffer are denoted bold. In case a frame is read from a particular position, whereby this same position is next filled by another frame, this is indicated by the "/" in between both identifiers.

At the beginning of the first clock pulse, where the value of i is 0, the contents of buffer position having address pr=0 is read out from CM for transfer to MF. Since at that moment nothing was present in the buffer, nothing is read out, as is represented by the dash. During this same first clock cycle, the write address pw is calculated in accordance to formula (3), resulting in that the cell that has arrived, having identifier 0, is also placed in memory position 0. This is shown by the italic "0", surrounded by the rectangle, that is placed in buffer position with address 0. During the next clock cycle, the contents of buffer position with address 1 is first read out, represented by the "−" since this position was empty; whereas the received cell having identifier "1" is also written in this same position, as represented by the italic "1" surrounded by the rectangle. The cell with identifier "0" in position 0 is kept there. This mechanism can be further followed, and it will be apparent that although frames that are received in a different sequence as the one with which they were previously transmitted, for instance cells with identifier 3 and 4, are still read out for transmission to the multiframe memory in their original sequence, i.e. frame with identifier 3 is read out before frame with identifier 4. Thus the original sequence of transmission is preserved, i.e., the order with which cells are read out to the multiframe memory is 0,1,2,3,4,5,6,7,0,1,2,3,4,5,6,7 whereby the second sequence with identifiers 0 to 7 corresponds to the 8 to 16th frames transmitted. It can also be observed that even if different frames are received during one clock cycle, that these are still written at separate locations such as to enable them to be read out in their original sequence, for instance cells with identifier 2 and 4, received during clock pulse with i=15.

It further is to be remarked that the modulo operation in this invention always calculates the positive rest. Thus, (−10) modulo 8=6, (−6) modulo 8=2, 6 modulo 8=6.

While the principles of the invention have been described above in connection with specific apparatus, it is to be clearly understood that this description is made only by way of example and not as a limitation on the scope of the invention, as defined in the appended claims.

What is claimed is:

1. A method for assembling frames of a multiframe, wherein said method comprises:
calculating, for each of said frames, the value of an identifier for inclusion into each of said frames before transmitting them from a transmitter at the rate of a transmitter clock,
temporarily storing said frames into a temporary buffer of a receiver before reading them out from said temporary buffer for storage to a multi frame buffer memory,
wherein said method further comprises:
synchronizing a receiver clock with said transmitter clock,
calculating said identifier according to a predetermined algorithm such that an amount of distinct values that said identifier can have is less than the amount of frames within said multiframe,
extracting said identifier from said frames within said receiver for determining a position in said temporary buffer for storing said incoming frames, wherein an amount of memory locations of said temporary buffer is smaller than said amount of frames within said multiframe, and said frames are read from positions in said temporary buffer for storage into locations of said multiframe buffer memory, irrespective of said identifier value.

2. The method according to claim 1, wherein:
said amount of memory locations of said temporary buffer is not smaller than the maximum cell delay between said transmitter and said receiver; and
said amount of distinct values that said identifier can have is larger than said maximum cell delays.

3. The method according to claim 2, wherein
a write position address of a memory location within said temporary buffer, (CM) into which an incoming frame is to be written, is calculated from said amount of memory locations within said temporary buffer, from the value of said identifier included in said incoming frame, from said amount of distinct values that said identifier can have, and from a recorded amount of transmitter clock pulses.

4. The method according to claim 3, wherein
said write position address is calculated according to:

$$pw=(((c+x-i-1) \text{ modulo } m)+i+1) \text{ modulo } d \qquad (3)$$

wherein pw represents said write position address within said temporary buffer into which an incoming frame is to be written,
m represents said amount of distinct values,
c represents the value of said identifier included in said incoming frame,
i represents said recorded amount of transmitter clock pulses,
x represents said amount of memory locations within said temporary buffer, and
d represents said maximum cell delay between said transmitter and said receiver.

5. The method according to claim 2, wherein
a read position address of a memory location within said temporary buffer from which an already stored frame is going to be read for subsequent transmission into said multiframe buffer memory is calculated from said amount of memory locations within said temporary buffer and said recorded amount of transmitter clock pulses.

6. The method according to claim 5, wherein
said read position address is calculated according to:
pr=i modulo x
wherein whereby pr represents said read position address, and
i represents said recorded amount of transmitter clock pulses, and x represents said amount of memory locations within said temporary buffer.

7. The method according to claim 1, wherein said value of said identifier is calculated according to:
c=i modulo m
wherein i represents said recorded amount of transmitter clock pulses, and
m represents said amount of distinct values said identifier can have.

8. A frame receiver device comprising:
a temporary buffer arrangement that receives incoming frames of a multiframe transmitted from a transmitter and comprising a temporary buffer to temporarily store said incoming frames,
a multiframe buffer memory coupled to said temporary buffer arrangement and adapted to store said incoming frames received from said temporary buffer arrangement,
said frame receiver further comprises:
a receiver clock synchronized with a transmitter clock,
said temporary buffer has an amount of memory locations that is smaller than the amount of frames within said multiframe,
said temporary buffer arrangement comprises identifier extraction means to extract an identifier from each incoming frame, whereby an amount of distinct values that said identifier can have is less than the amount of frames within said multiframe,
said temporary buffer arrangement comprises write addressing means to calculate, from the value of said identifier from a respective incoming frame, a write position address within said temporary buffer for storing said respective incoming frame, and
said temporary buffer arrangement comprises read addressing means to calculate a read position address of a memory location within said temporary buffer from which an already stored frame is going to be read for storage into said multiframe buffer, irrespective of the value of the identifier of said already stored frame.

9. The frame receiver device according to claim 8, wherein:
said amount of memory locations of said temporary buffer is not smaller than the maximum cell delay between said transmitter and said frame receiver device, and
said amount of distinct values that said identifier can have is larger than said maximum cell delay.

10. The frame receiver according to claim 9, wherein said write addressing means calculates said write position address from said amount of memory locations within said temporary buffer, from said amount of distinct values that said identifier can have, and from a recorded amount of transmitter clock pulses.

11. The frame receiver device according to claim 10, wherein
said write addressing means calculates said write position address according to:

$pw=(((c+x+i-1)\ \text{modulo}\ m)+i+1)\ \text{modulo}\ d$ wherein pw represents said write position address within said temporary buffer,
m represents said amount of distinct values,
c represents the value of said identifier of said incoming frame,
i represents said recorded amount of transmitter clock pulses, x represents said amount of memory locations within said temporary buffer, and
d represents said maximum cell delay between said transmitter and said receiver.

12. The frame receiver device according to claim 9, wherein
said read addressing means calculates said read position address, from said amount of memory locations within said temporary buffer and from said recorded amount of transmitter clock pulses.

13. The frame receiver device according to claim 12, wherein
said read addressing means calculates said read position address according to:
pr=i modulo x
wherein pr represents said read position address,
i represents said recorded amount of transmitter clock pulses, and
x represents said amount of memory locations within said temporary buffer.

14. The frame receiver device according to claim 10, further comprising
a receiver counter that calculates said recorded amount of transmitter clock pulses as an amount of elapsed clock pulses of said receiver clock included in said frame receiver devices.

15. A transmitter of a communications network adapted to transmit frames of a multiframe to a receiver device, said transmitter calculating and inserting into each of said frames an identifier before transmitting said frames at the rate of a transmitter clock, wherein
an amount of distinct values of said identifier is less than an amount of frames within said multiframe, said transmitter clock is synchronous with a receiver clock of said receiver device and said identifier determines a position in a temporary buffer disposed on said receiver for storing said frames, wherein an amount of memory locations of said temporary buffer is smaller than the amount of frames within said multiframe, and said frames are read from positions in said temporary buffer for storage into locations of a multiframe buffer memory, irrespective of said identifier value.

16. A receiver of a communications network that receives frames of a multiframe transmitted by a transmitter of said communications network, wherein
said receiver comprises a frame receiver device according to claim 8.

17. A communications network comprising a transmitter that transmits subsequent frames of a multiframe, and a receiver according to claim 16 that receives incoming frames for subsequent assembly into said multiframe, wherein
said transmitter is adapted to calculate and to insert, within each of said subsequent frames, an identifier before transmitting said frames at the rate of a transmitter clock.

18. A frame receiver device comprising:
a receiver clock synchronized with a transmitter clock;
a temporary buffer arrangement that receives incoming frames of a multiframe transmitted from a transmitter and comprising a temporary buffer to temporarily store said incoming frames, wherein said temporary buffer has an amount of memory locations that is smaller than the amount of frames within said multiframe; and
a multiframe buffer memory coupled to said temporary buffer arrangement and adapted to store said incoming frames received from said temporary buffer arrangement, said temporary buffer arrangement further comprising:
- an identifier extraction device to extract an identifier from each incoming frame, whereby an amount of distinct values that said identifier can have is less than the amount of frames within said multiframe,
- a write address device to calculate, from the value of said identifier from a respective incoming frame, a write position address within said temporary buffer for storing said respective incoming frame, and
- a read address device to calculate a read position address of a memory location within said temporary buffer from which an already stored frame is going to be read for storage into said multiframe buffer, irrespective of the value of the identifier of said already stored frame.

19. The frame receiver device according to claim 18, wherein:
- said amount of memory locations of said temporary buffer is not smaller than the maximum cell delay between said transmitter and said frame receiver device, and
- said amount of distinct values that said identifier can have is larger than said maximum cell delay.

20. The frame receiver according to claim 19, wherein said write address device calculates said write position address from said amount of memory locations within said temporary buffer, from said amount of distinct values that said identifier can have and from a recorded amount of transmitter clock pulses.

21. The frame receiver device according to claim 20, wherein said write address device calculates said write position address according to:

$$pw = (((c+x+i-1) \bmod m) + i + 1) \bmod d$$

wherein pw represents said write position address within said temporary buffer,
- m represents said amount of distinct values,
- c represents the value of said identifier of said incoming frame,
- i represents said recorded amount of transmitter clock pulses,
- x represents said amount of memory locations within said temporary buffer, and
- d represents said maximum cell delay between said transmitter and said receiver.

22. The frame receiver device according to claim 19, wherein said read address device calculates said read position address, from said amount of memory locations within said temporary buffer and from said recorded amount of transmitter clock pulses.

23. The frame receiver device according to claim 22, wherein said read address device calculates said read position address according to:

$$pr = i \bmod x$$

wherein pr represents said read position address,
- i represents said recorded amount of transmitter clock pulses, and
- x represents said amount of memory locations within said temporary buffer.

24. The frame receiver device according to claim 20, further comprising a receiver counter that calculates said recorded amount of transmitter clock pulses as an amount of elapsed clock pulses of said reciever clock included in said frame receiver device.

25. A receiver of a communications network that receives frames of a multiframe transmitted by a transmitter of said communications network, wherein said receiver comprises a frame receiver device according to claim 18.

26. A communications network comprising:
- a transmitter that transmits subsequent frames of a multiframe, and
- a receiver according to claim 25,
    Wherein said receiver receives incoming frames for subsequent assembly into said multiframe and said transmitter calculates and inserts, within each of said subsequent frames, an identifier before transmitting said frames at the rate of a transmitter clock.

* * * * *